United States Patent [19]
Ueda

[11] Patent Number: 5,524,825
[45] Date of Patent: Jun. 11, 1996

[54] UNIT TYPE FUEL INJECTOR FOR INTERNAL COMBUSTION ENGINES

[75] Inventor: Atsushi Ueda, Higashimatsuyama, Japan

[73] Assignee: Zexel Corporation, Tokyo, Japan

[21] Appl. No.: 312,614

[22] Filed: Sep. 27, 1994

[30] Foreign Application Priority Data

Sep. 28, 1993 [JP] Japan ................................. 5-263158

[51] Int. Cl.$^6$ ................................................ F02M 55/02
[52] U.S. Cl. ......................... 239/88; 239/127; 239/585.1
[58] Field of Search ............................... 239/88, 93, 124, 239/127, 585.1, 533.9; 123/466, 506

[56] References Cited

U.S. PATENT DOCUMENTS

| 4,618,095 | 10/1986 | Spoolstra | 239/93 X |
| 5,370,095 | 12/1994 | Yamaguchi | 239/88 X |
| 5,385,301 | 1/1995 | Ueda | 239/88 |
| 5,402,944 | 4/1995 | Pape | 239/88 |

FOREIGN PATENT DOCUMENTS

| 2-67455 | 3/1990 | Japan. | |
| 280441 | 10/1993 | Japan | 239/88 |

*Primary Examiner*—Kevin Weldon
*Attorney, Agent, or Firm*—Pollock, Vande Sande & Priddy

[57] ABSTRACT

In a fuel injector arranged such that fuel injection is controlled by an opening/closing operation of a solenoid valve, occurrence of bouncing motion of the valve rod after the deenergization of the solenoid valve to terminate the fuel injection is prevented by forming a stopper with a flat surface for making in-plane contact with the end surface of the valve rod and defining in the valve rod a pressure chamber having an opening at the end surface. The chamber is adapted to be filled with the fuel to suppress the bouncing motion of the valve rod at the valve opening operation.

7 Claims, 5 Drawing Sheets

5,524,825

UNIT TYPE FUEL INJECTOR FOR INTERNAL COMBUSTION ENGINES

BACKGROUND OF THE INVENTION

1. Field of the Invention

This invention relates to a unit type fuel injector for fuel injection in an internal combustion engine.

2. Description of the Prior Art

The conventional unit type fuel injector has a fuel injection section for injecting pressurized fuel received from a fuel pressurization section for pressurizing the fuel and is constituted so that the pressure in a fuel pressure chamber of the fuel pressurization section can be spilled to a fuel supply return chamber provided in a solenoid valve section by lifting a valve needle in the solenoid valve section off the associated valve seat cone. The fuel injection timing can be controlled by controlling the timing at which the needle is seated on the seat cone. However, since the pressure in the fuel pressure chamber of a fuel injector of this type is extremely high, the pressure in the fuel supply return chamber rises rapidly at the time the needle of the solenoid valve section is lifted off the seat cone for spilling the pressure in the fuel pressure chamber. Since the pressure this produces in the fuel supply return chamber causes a force to act on the needle in the opposite direction from that for lifting the needle off the seat cone, the pressure in the fuel pressure chamber cannot drop sharply. This degrades fuel injection cutoff.

For overcoming this problem, Japanese Patent Application Public Disclosure No. Hei 2-67455(67455/1990) teaches a fuel injector in which the valve needle is formed on one end of a needle valve rod, a flange is provided on the needle valve rod to be in liquid-tight sliding contact with the wall defining the space surrounding it, and the pressure produced in the fuel supply return chamber by the separation of the needle from the seat cone is caused to act on the flange in the direction causing the valve to open. More specifically, the proposed fuel injector is configured so that the pressure increase produced in the fuel supply return chamber at the time the needle rises off the seat cone is led through a passage in the needle valve rod to the opposite side from the needle and applied to the flange. This configuration is disadvantageous in that the force produced by the rapid pressure increase arising in the fuel supply return chamber at the time the needle lifts off the seat cone acts directly on the needle in the direction causing it to move toward the seat cone before the pressure led to the flange can act on it in the opposite direction. Valve opening therefore tends to be hindered even when the control current to the solenoid in the solenoid valve section is turned off.

If in order to overcome this disadvantage the backward speed of the valve body is increased to quickly lift the valve body of the solenoid valve off the seat cone, the valve body will collide strongly against the stopper in its backward operation, causing the valve body to bounce. Furthermore, this will disadvantageously cause secondary injection to occur.

SUMMARY OF THE INVENTION

An object of the present invention is to provide an improved unit type fuel injector for internal combustion engines which is capable of overcoming the aforementioned drawbacks of the prior art.

Another object of the present invention is to provide a unit type fuel injector with a solenoid valve for controlling the fuel injection, which is able to complete the valve opening operation of the solenoid valve in a short period of time without making the valve body of the solenoid valve bounce.

For realizing these objects, the invention provides a unit type fuel injector for internal combustion engines comprising a fuel pressurization section having a fuel pressure chamber and a pump plunger disposed in the fuel pressure chamber for pressurizing fuel supplied from fuel pump means, a fuel injection section for spraying fuel pressurized by the fuel pressurization section, and a solenoid valve section which is connected with the fuel pump means via fuel passage means for fuel supply and return and which at a prescribed time during the period that the pump plunger pressurizes fuel in the fuel pressure chamber spills pressurized fuel in the fuel pressure chamber to the fuel passage means for terminating fuel spraying by the fuel injection section, the solenoid valve section comprising a housing, a solenoid section attached to the housing, an armature chamber for housing an armature cooperative with the solenoid section, the armature chamber communicating with the fuel passage means, the armature chamber being formed in the housing, a guide hole formed in communication with the armature chamber, a valve rod having one end connected with the armature, the valve rod being formed with a valve head tapered to increase in diameter with increasing distance from the armature and being guided by the guide hole for reciprocal motion relative to the armature chamber, a fuel reservoir formed by enlarging a portion of the guide hole so as to surround the valve head, a passage external to the valve and for communicating the fuel reservoir with the armature chamber, communicating means for communicating the fuel reservoir with the fuel pressure chamber, a tapered portion for seating an increased diameter portion of the valve head when the solenoid is energized, the tapered portion being formed in a wall of the fuel reservoir to decrease in diameter in the direction of the armature chamber and to face inward toward the reservoir such that movement of the valve rod away from the armature chamber causes the valve head to move into the fuel reservoir away from the tapered portion, spring means for urging the valve head away from the tapered portion, a stopper member for limiting a lifting amount of the valve rod urged by the spring means, the stopper member having a flat surface which makes in-plane contact with a flat surface of the end portion of the valve rod, a chamber for accommodating the stopper member and the end portion of the valve rod and being adapted to be filled with fuel, and a pressure chamber formed in the valve rod and having an opening at the flat surface of the end portion of the valve rod.

The most important features of the present invention are that, in order to avoid the occurrence of the bouncing motion of the valve rod caused when the flat surface of the end portion of the valve rod hits the stopper member during its backward stroke after the deenergization of the solenoid section to terminate the fuel injection, the flat surface for making in-plane contact with the end surface of the valve rod is formed on the stopper member and a pressure chamber having an opening facing the end surface is defined in the valve rod and that the chamber adapted to be filled with the fuel and to accommodate the stopper member and the end portion of the valve rod is provided.

When the solenoid is energized, the valve rod moves against the force of the spring means to force the valve head against the tapered portion, thereby shutting off the fuel reservoir from the fuel passage means. As a result, fuel is pressurized in the fuel pressure chamber by the action of the pump plunger and the pressurized fuel is injected from the fuel injection section.

When the solenoid is deenergized at the prescribed time, the force of the spring means pulls the valve head down to separate it from the tapered portion. As a result, the fuel in the fuel reservoir, which is at approximately the same pressure as the fuel in the fuel pressure chamber. Spills to the armature chamber through the passage external to the valve rod and the gap arising between the valve head and the tapered portion, whereby the pressure in the fuel pressure chamber can be lowered. At this time, since the fuel pressure spilled from the fuel reservoir to the armature chamber acts on the tapered valve head so that the valve rod is applied with a force that pushes it against the force of the spring means, the valve opening action is promoted.

When the valve opening operation is carried out as described above, the valve rod is moved backward at an extremely high speed and the flat surface of the end portion comes close to the flat surface of the stopper member so as to make in-plane contact therewith. As a result, the fuel in the pressure chamber and present between the flat surfaces of the end portion and the stopper member is pressurized. Consequently, the damping force produced by the fuel pressurization acts on the valve rod moving backward to suppress the bouncing motion of the valve rod at the time of the valve opening operation.

This invention will be better understood and other objects and advantages thereof will be more apparent from the following detailed description of preferred embodiments made with reference to the accompanying drawings.

DESCRIPTION OF THE PREFERRED EMBODIMENTS

Figure 1:
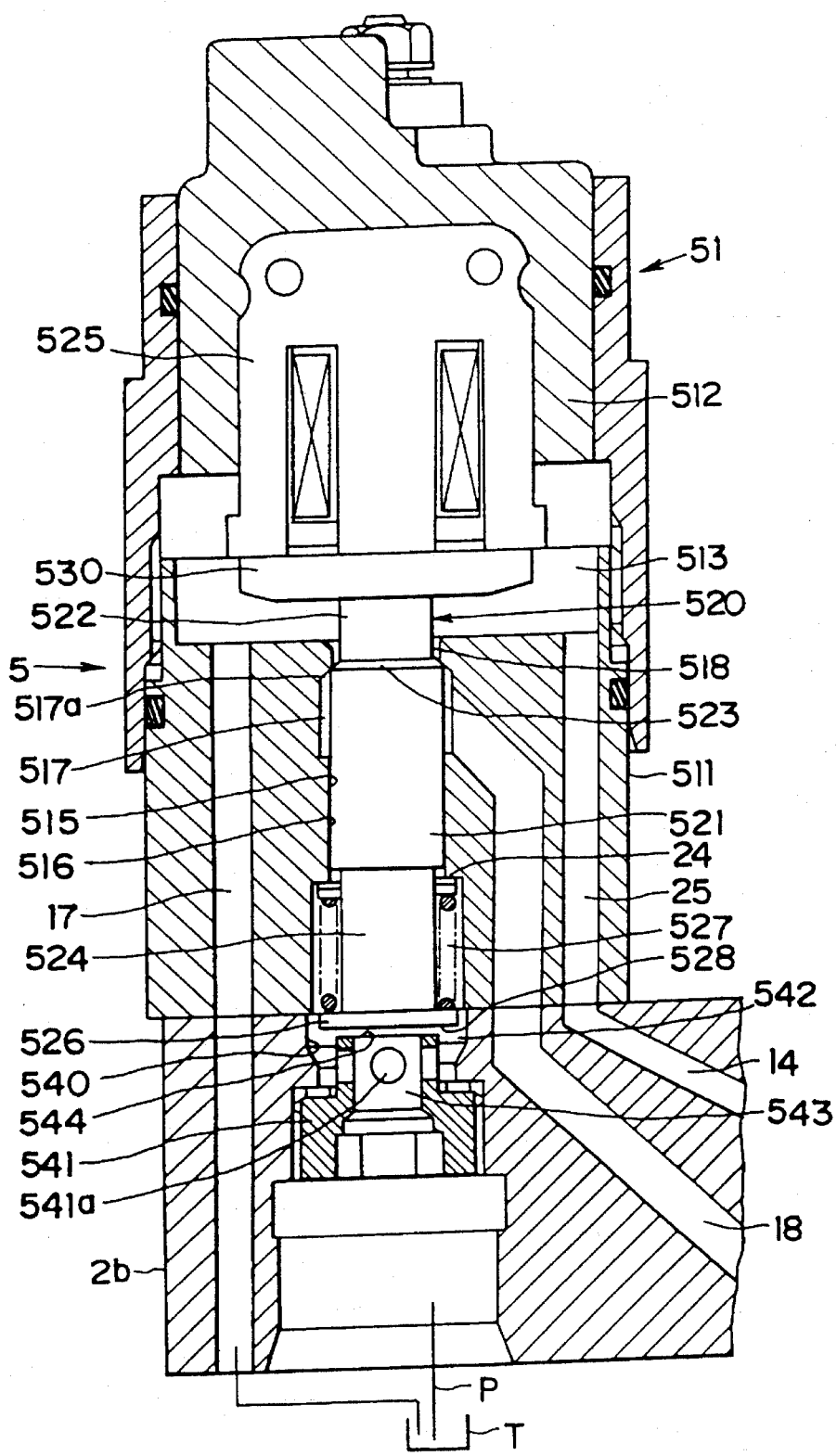
FIG. 1 is a sectional view of an essential portion of an embodiment of the fuel injector according to this invention.
Figure 2:
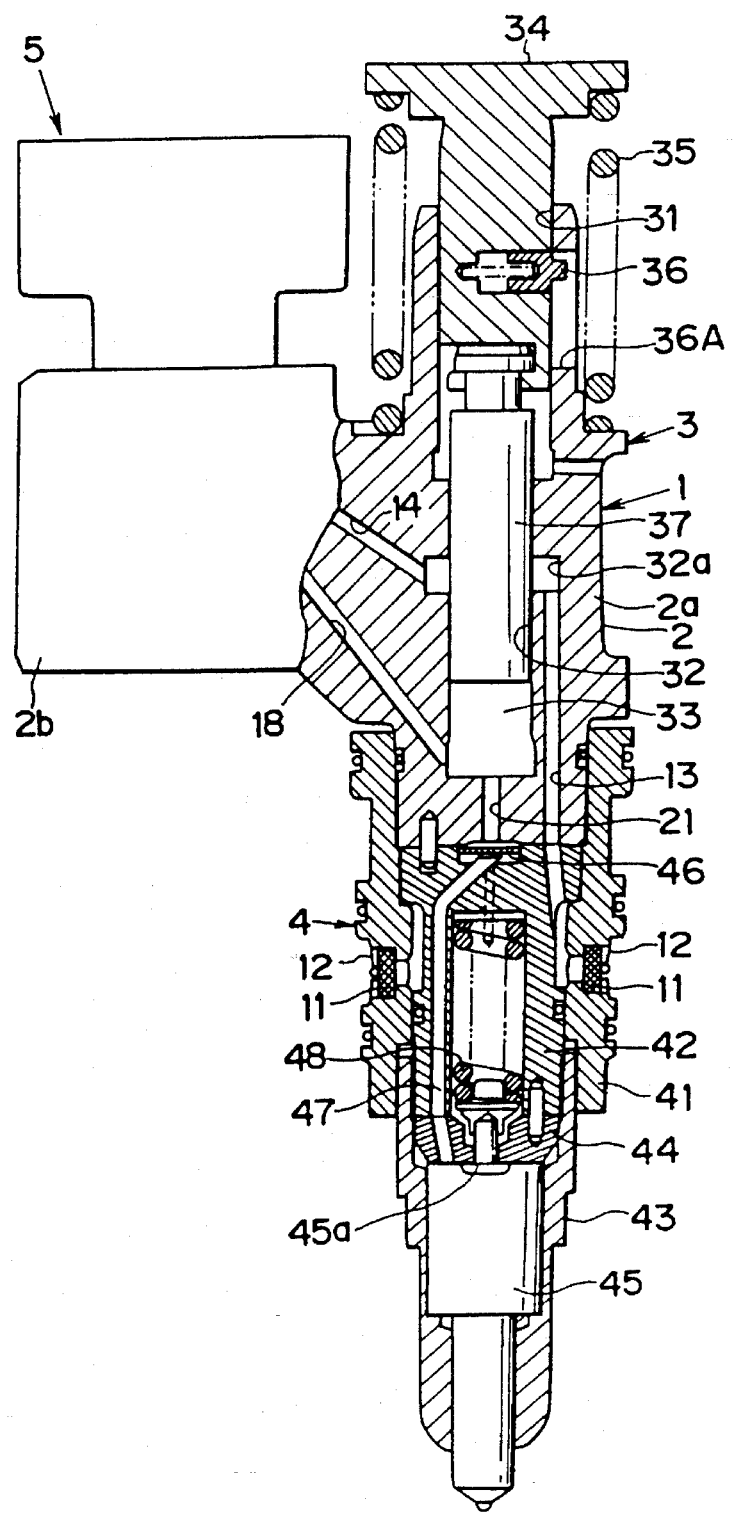
FIG. 2 is a side view, partially in section, of the embodiment of FIG. 1.

FIGS. 1 and 2 show an embodiment of the present invention. The main unit of the injector, designated by reference numeral 1, has a main unit member 2. As shown in FIG. 2, the main unit member 2 consists of a vertical member 2a and a side member 2b. The vertical member 2a is provided with a fuel pressurization section 3 for pressurizing fuel and a fuel injection section 4 for injecting fuel pressurized by the fuel pressurization section 3 into an engine combustion chamber (not shown). The side member 2b is provided with a solenoid valve section 5 for controlling the fuel injection start time and the fuel injection stop time.

The fuel pressurization section 3 will be explained first. The vertical member 2a is formed, in order from the top down, with a large-diameter cylinder 31 extending downward from its upper end, a small-diameter cylinder 32 extending downward from the bottom end of, and coaxially with, the large diameter cylinder 31, and a fuel pressure chamber 33.

A follower 34 is slidably disposed in the large-diameter cylinder 31. A plunger spring 35 provided between the upper end of the follower 34 and the upper end of the vertical member 2a urges the follower 34 upward into pressure contact with the cam of a camshaft (not shown). The follower 34 moves up and down following the rotation of the cam. A limit member 36 is attached to the follower 34 through an oblong hole 36a formed in the upper part of the vertical member 2a and the upper end of the follower 34 stroke is limited by the abutment of the limit member 36 against the uppermost portion of the wall of the oblong hole 36a.

A pump plunger 37 is slidably disposed in the small-diameter cylinder 32. The top of the pump plunger 37 is fixed to the bottom of the follower 34 so that it is unable to slide vertically relative to the follower 34 but able to slide vertically together therewith. The pump plunger 37 compresses the fuel in the fuel pressure chamber 33 when it moves down (compression stroke) and applies suction to the fuel in the fuel pressure chamber 33 when it moves up (decompression stroke). Near the vertical center of the small-diameter cylinder 32 there is provided a leak prevention recess 32a for preventing compressed fuel in the fuel pressure chamber 33 from leaking to the exterior of the injector by passing between the wall of the small-diameter cylinder 32 and the surface of the pump plunger 37.

The fuel injection section 4 will now be explained. A retaining cylinder 41 is screwed onto the bottom end of the vertical member 2a with its axis aligned with that of the small-diameter cylinder 32. The retaining cylinder 41 accommodates a spring holder 42. The fastening of the retaining cylinder 41 to the vertical member 2a also fastens the spring holder 42 to the vertical member 2a. A nozzle holder 43 is screwed into the bottom end of the spring holder 42 with its axis aligned with that of the retaining cylinder 41. The nozzle holder 43 retains a spacer 44 just under the spring holder 42 and an injection nozzle 45 under the spacer 44. The fastening of the nozzle holder 43 to the spring holder 42 also fastens the spacer 44 and the injection nozzle 45 to the spring holder 42 and, in turn, to the vertical member 2a.

In the foregoing arrangement, when the fuel in the fuel pressure chamber 33 is compressed by the pump plunger 37, the compressed fuel passes through a passage 21 formed in the vertical member 2a, a check valve 46 of known structure provided in the spring holder 42, a passage 47 traversing the spring holder 42 and the spacer 44, and into the injection nozzle 45. The compressed fuel entering the injection nozzle 45 lifts a needle valve 45a of the injection nozzle 45 against the force of a nozzle spring 48 provided in the spring holder 42. As a result, the compressed fuel is jetted from a spray hole (not shown) formed in the tip of the injection nozzle 45.

The solenoid valve section 5 shown in FIG. 1 will now be explained. A solenoid valve, indicated by reference numeral 51, comprises a valve housing 511 and a stator 512 screwed onto the top end of the valve housing 511. An armature chamber 513 is formed between the valve housing 511 and the stator 512. A valve rod passage 515 is formed in the valve housing 511 to extend from the floor of the armature chamber 513 to the bottom of the valve housing 511. The valve rod passage 515 has a guide hole portion 516 in which the large-diameter portion 521 of a valve rod 520 is oil-tightly accommodated to be slidable in its axial direction. It also has a fuel reservoir 517 formed at an intermediate portion of the guide hole portion 516 by radially expanding a portion of the valve rod passage 515.

The valve rod 520 is integrally formed above its large-diameter portion 521 with a medium-diameter portion 522 whose distal end is fastened to an armature 530. A valve head 523 is formed between the large-diameter portion 521 and the medium-diameter portion 522. The valve head 523 is formed by tapering the large-diameter portion 521 toward the armature 530 and the largest diameter portion of the valve head 523 makes line contact with a tapered valve seat portion 517a formed in the fuel reservoir 517 (see FIG. 3).

Figure 3:
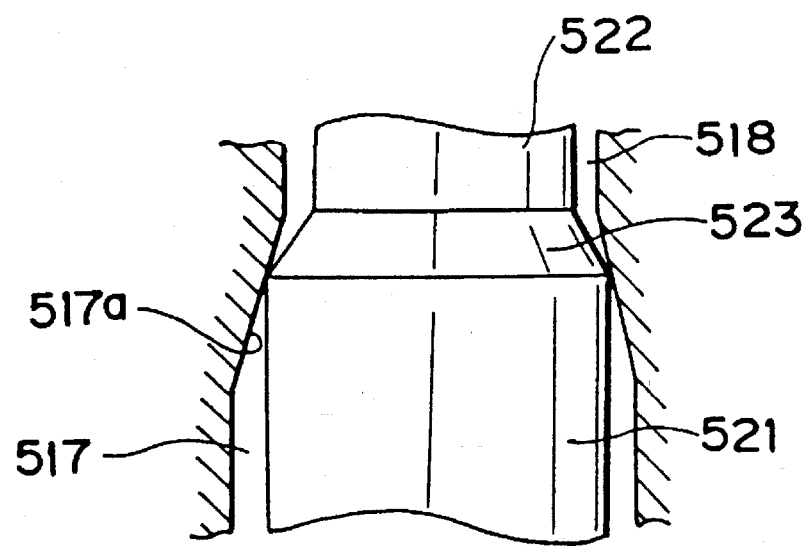
FIG. 3 is an enlarged view of an essential portion of FIG. 1.

As will be understood from FIG. 3, when the valve head 523 is seated on the valve seat portion 517a of the valve rod passage 515, the fuel pressure in the fuel reservoir 517 does not act on the valve head 523. Since the diameter of the medium-diameter portion 522 is smaller than that of the large-diameter portion 521, an annular space 518 is formed between the guide hole portion 516 and the medium-diameter portion 522. Thus when the valve head 523 separates from the valve seat portion 517a, the pressurized fuel in the fuel reservoir 517 spills to the armature chamber 513 through the annular space 518 (see FIG. 1). The supply of pressurized fuel to the fuel reservoir 517 is explained later.

As shown in FIGS. 1 and 2, the stator 512 opposed to the armature 530 is provided with a solenoid 525. When current is passed through the solenoid 525, it produces a magnetic force which lifts the armature 530 and causes the valve head 523 to seat on the valve seat portion 517a. For separating the valve head 523 from the valve seat portion 517a when the supply of current to the solenoid 525 is stopped, the valve rod 520 is constantly urged downward by the force of a coil spring 527 interposed between a spring seat 526 formed at the bottom end of a support rod 524 extending downward from the bottom end of the valve rod 520 and a step portion 24.

The side member 2b is formed with a hole 540 communicating with the valve rod passage 515, and a stopper member 541 is screwed into the hole 540 to be fixed therein. A chamber 542 for accommodating the end portion of the valve rod 520 is defined in the side member 2b by fixing the stopper member 541 in the hole 540, and fuel fills the chamber 542 in a manner described later.

A projecting portion 543 is upwardly formed at the center of the upper surface of the stopper member 541 so as to face to the lower end surface 528 of the valve rod 520. The upper end surface 544 of the projecting portion 543 is flat, and when the solenoid 525 is deenergized, the valve rod 520 moves backward until the lower end surface 528 of the valve rod 520 makes in-plane contact with the upper end surface 544, which serves as a stopper surface, whereby the maximum lift amount of the valve rod 520 can be limited.

The starting and stopping of current supply to the solenoid 525 is controlled by a microcomputer or other such controller in accordance with the engine speed, engine load and other operating conditions. Since the method of control is well known, it will not be explained further here.

Fuel leaking between the large-diameter portion 521 and the guide hole portion 516, accumulates in the chamber 542 and the excess fuel accumulated in the chamber 542 is returned to the fuel tank T through a passage 541a formed in the stopper member 541 and a drain passage P formed in the bottom end of the side member 2b. Thus while the chamber 542 is always filled with fuel, the configuration ensures that no backpressure is produced which acts on the valve rod 520 and hinders its movement.

The manner in which the fuel passages are formed for enabling the solenoid valve section 5 constituted in the foregoing manner to control the fuel injection start and stop times will now be explained. A fuel inlet 12 is formed in the wall of the retaining cylinder 41 and provided with a filter 11. A fuel pump (not shown) pumps fuel to the fuel inlet 12 from the fuel tank T. The fuel inlet 12 communicates with the leak prevention recess 32a through a passage 13 formed in the spring holder 42 and the vertical member 2a and from here with the armature chamber 513 through a passage 14 and a passage 25 formed in the valve housing 511. Since the armature chamber 513 is formed with a fuel outlet 17, the fuel is constantly circulated from the fuel inlet 12 through the armature chamber 513 and out the fuel outlet 17 which returns the fuel upstream of the inlet of the fuel pump via the fuel tank T. The fuel reservoir 517 and the fuel pressure chamber 33 are connected by a passage 18 extending through the valve housing 511 and the main unit member 2.

In the fuel injector of this configuration, the supply of current to the solenoid 525 is stopped and the solenoid valve 51 is opened during the upward stroke of the pump plunger 37 and, therefore, the fuel in the armature chamber 513 passes into the fuel reservoir 517 as well as into the fuel pressure chamber 33 through the passage 18.

When the pump plunger 37 begins its downward stroke, the fuel in the fuel pressure chamber 33 is pressurized. During the initial part of the stroke, however, the solenoid valve 51 remains open. Therefore, the fuel in the fuel pressure chamber 33 merely flows back into the armature chamber 513 through the passage 18 and the fuel reservoir 517. Although the fuel is pressurized to some extent, the degree of pressurization is not high enough to lift the needle valve 45a against the force of the nozzle spring 48 and, therefore, no fuel is sprayed from the injection nozzle 45.

During the downstroke of the pump plunger 37, a control section (not shown) decides the fuel injection time from the engine operating condition and, based on this decision, current is passed through the solenoid 525. As a result, the valve head 523 rises against the force of the coil spring 527 and seats itself on the valve seat portion 517a, thus closing the solenoid valve 51. This shuts off the communication between the armature chamber 513 and the fuel reservoir 517 and, as a result, between the armature chamber 513 and the fuel pressure chamber 33. The pressure of the fuel in the fuel pressure chamber 33 therefore increases to a high level. This highly pressurized fuel passes through the passage 21, the check valve 46 and the passage 47 to the injection nozzle 45a from where it is sprayed from the spay hole.

When the control section decides that fuel injection is to be stopped, supply of current to the solenoid 525 is discontinued. As a result, the valve rod 520 moves back owing to the force of the coil spring 527 until its lower end surface 528 makes in-plane contact with the upper end surface 544 of the projected portion 543, thus opening the solenoid valve 51. Since the fuel in the fuel pressure chamber 33 therefore flows back into the armature chamber 513, the pressure in the fuel pressure chamber 33 falls. When the pressure in the fuel pressure chamber 33 becomes lower than the force of the nozzle spring 48, the needle valve 45a seats itself and fuel injection is terminated.

In the fuel injector of the foregoing configuration, when the solenoid valve 51 is opened during fuel pressurization by the pump plunger 37 so as to stop fuel injection, the pressure propagating from the fuel pressure chamber 33 is spilled to the armature chamber 513 where it acts on the valve rod 520 to force it downward. In other words, since the pressure spilled to the armature chamber 513 acts to separate the valve head 523 from the valve seat portion 517a, the opening of the solenoid valve 51 occurs as a high-speed action.

In addition, since the fuel injector is configured to enable fuel to be circulated through the armature chamber 513, temperature increase of the stator 512 can be prevented by the cooling effect of the circulating fuel.

Since the fuel injector 1 is arranged such that the opening action of the solenoid valve 51 occurs as a high-speed action as described above, the valve rod 520 will collide strongly against the stopper member 541 when the solenoid 525 is deenergized. As a result, the valve rod 520 will bounce markedly after hitting the stopper member 541 and accordingly secondary injection tends to occur.

Figure 4:
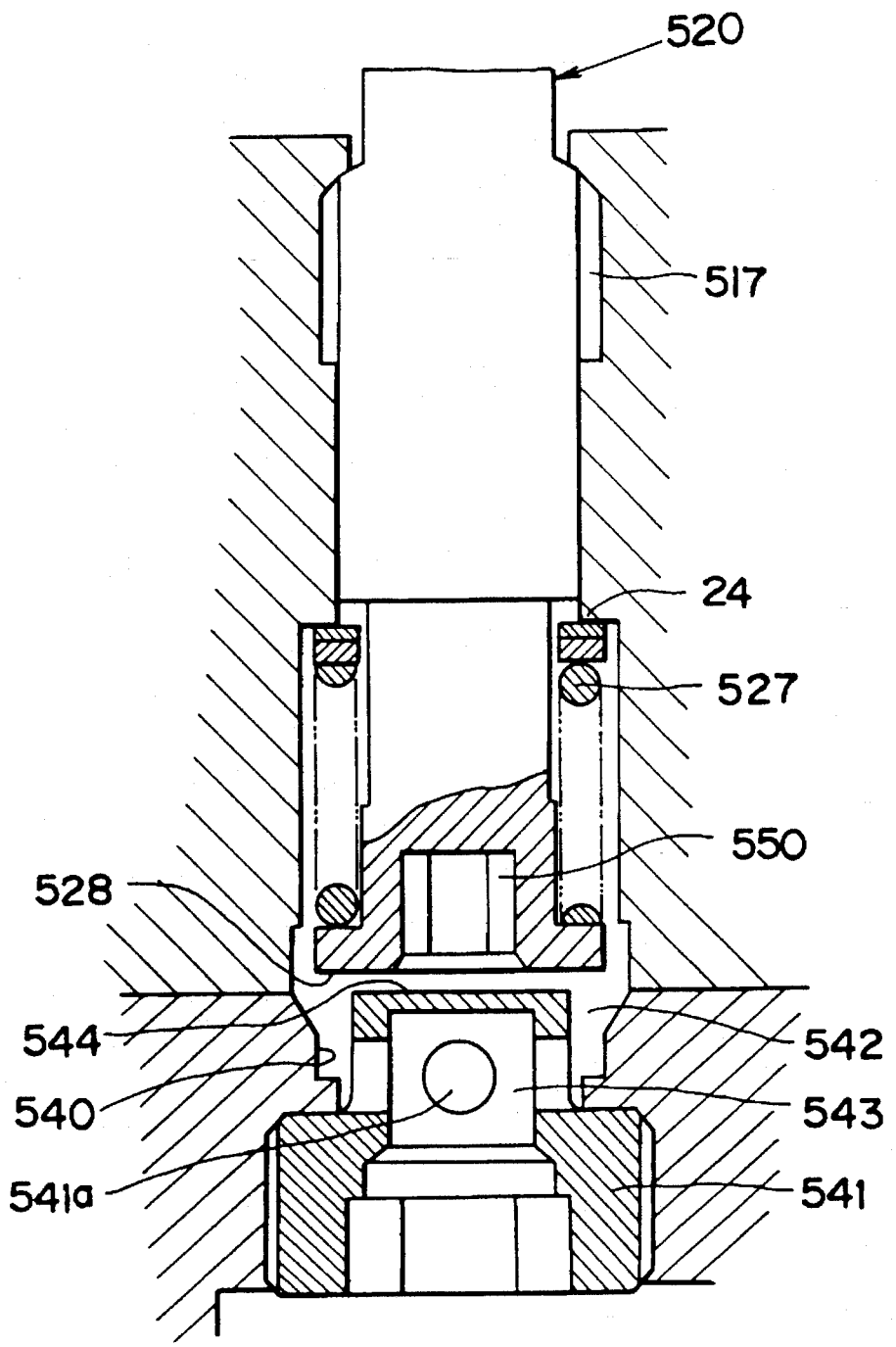
FIG. 4 is an enlarged sectional view illustrating another essential portion or the solenoid valve section show, in FIG. 1.

As shown in FIG. 4, for preventing the occurrence of the bouncing motion of the valve rod 520, the fuel injector 1 according to the present invention is provided with a pressure chamber 550 defined in the lower end portion of the valve rod 520 so as to open at the lower end surface 528 of the valve rod 520. In the case where the valve rod 520 is provided with the pressure chamber 550, the fuel contained in the pressure chamber 550 and present between the lower end surface 528 and the upper surface 544 is pressurized by the backward motion of the valve rod 520 when the opening operation of the valve rod 520 is carried out, whereby a damping force acts on the valve rod 520. This damping force reduces the backward speed of the valve rod 520 particularly in the case where the valve rod 520 comes close to the stopper member 541, whereby the bouncing motion of the valve rod 520 is effectively suppressed. In this case, the foregoing effect owing to the damping force is realized only just before the lower end surface 528 of the valve rod 520 hits the stopper member 541, in other words, when the valve head 523 is fully away from the valve seat 517a, so that the spill rate of fuel in the solenoid valve 51 is not degraded.

Figure 5:
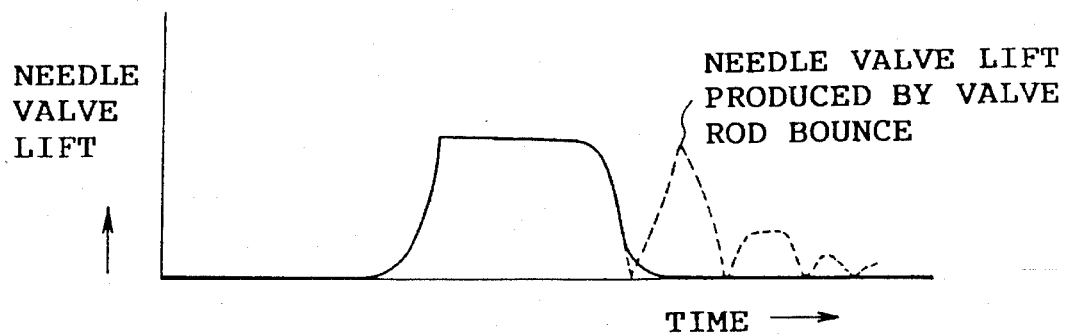
FIG. 5 is a graph showing the change in the lift of the valve needle of the fuel injector according to the present invention shown in FIGS. 1 to 4 when fuel is injected.
Figure 6:
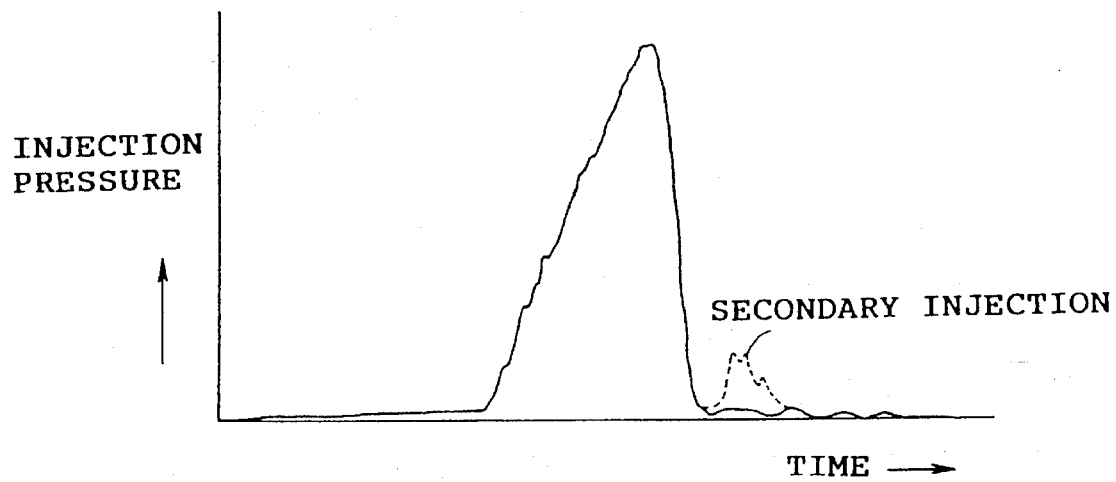
FIG. 6 is a graph showing the change in the injection pressure of the fuel injector according to the present invention shown in FIGS. 1 to 4 when fuel is injected.

In FIGS. 5 and 6, the solid lines show the time-course change in the lifting motion of the valve rod 520 and that of the injection pressure. The broken lines in FIGS. 5 and 6 show the time-course changes in the case where the pressure chamber 550 is not provided. It will be understood from these curves that almost no secondary injection is produced when the pressure chamber 550 is provided. Furthermore, since the impact force produced between the valve rod 520 and the stopper member 541 is reduced owing to the provision of the pressure chamber 550, the wearing of these parts is effectively suppressed and their service life is prolonged.

What is claimed is:

1. A unit type fuel injector for internal combustion engines comprising a fuel pressurization section having a fuel pressure chamber and a pump plunger disposed in the fuel pressure chamber for pressurizing fuel supplied from fuel pump means, a fuel injection section for spraying fuel pressurized by the fuel pressurization section, and a solenoid valve section which is connected with the fuel pump means via fuel passage means for fuel supply and return and which at a prescribed time during the period that the pump plunger pressurizes fuel in the fuel pressure chamber spills pressurized fuel in the fuel pressure chamber to the fuel passage means for terminating fuel spraying by the fuel injection section, the solenoid valve section comprising:

a housing, a solenoid section attached to the housing, an armature chamber for housing an armature co-operative with the solenoid section, the armature chamber communicating with the fuel passage means, the armature chamber being formed in the housing, a guide hole formed in communication with the armature chamber, a valve rod having one end connected with the armature, the valve rod being formed with a valve head tapered to increase in diameter with increasing distance from the armature and being guided by the guide hole for reciprocal motion relative to the armature chamber, a fuel reservoir formed by enlarging a portion of the guide hole so as to surround the valve head, a passage external to the valve and for communicating the fuel reservoir with the armature chamber, communicating means for communicating the fuel reservoir with the fuel pressure chamber, a tapered portion for seating an increased diameter portion of the valve head when the solenoid is energized, the tapered portion being formed in a wall of the fuel reservoir to decrease in diameter in the direction of the armature chamber and to face inward toward the reservoir such that movement of the valve rod away from the armature chamber causes the valve head to move into the fuel reservoir away from the tapered portion, spring means for urging the valve head away from the tapered portion, a stopper member for limiting a lifting amount of the valve rod urged by the spring means, the stopper member having a flat surface which makes in-plane contact with a flat surface of the end portion of the valve rod, a chamber for accommodating the stopper member and the end portion of the valve rod and being adapted to be filled with fuel, and a pressure chamber formed in the valve rod and having an opening at the flat surface of the end portion of the valve rod.

2. A unit type fuel injector as claimed in claim 1, wherein the fuel delivered by the fuel pump is circulated through the armature chamber via the fuel passage means.

3. A unit type fuel injector as claimed in claim 2, wherein the armature chamber serves as a part of the fuel passage means for circulating the fuel delivered by the fuel pump.

4. A unit type fuel injector as claimed in claim 3, wherein the fuel passage means comprises a first passage for supplying fuel to the armature chamber and a second passage for returning the fuel in the armature chamber toward an inlet of the fuel pump.

5. A unit type fuel injector as claimed in claim 2, wherein high-pressure fuel in the fuel reservoir is spilled to the armature chamber when the valve head is separated from the tapered portion for terminating fuel spraying.

6. A unit type fuel injector as claimed in claim 2, wherein fuel circulating through the armature chamber is sent to the fuel pressure chamber via the fuel reservoir when the valve head is separated from the tapered portion for fuel suction.

7. A unit type fuel injector as claimed in claim 1, wherein the increased diameter portion of the valve head makes in line contact with the tapered portion when the valve head is seated.

* * * * *